Jan. 6, 1931.  C. L. PAAS  1,787,836
MEANS FOR PREVENTING CONDENSATION ON WINDSHIELDS OR WINDOWS
Filed Feb. 18, 1930  2 Sheets-Sheet 1
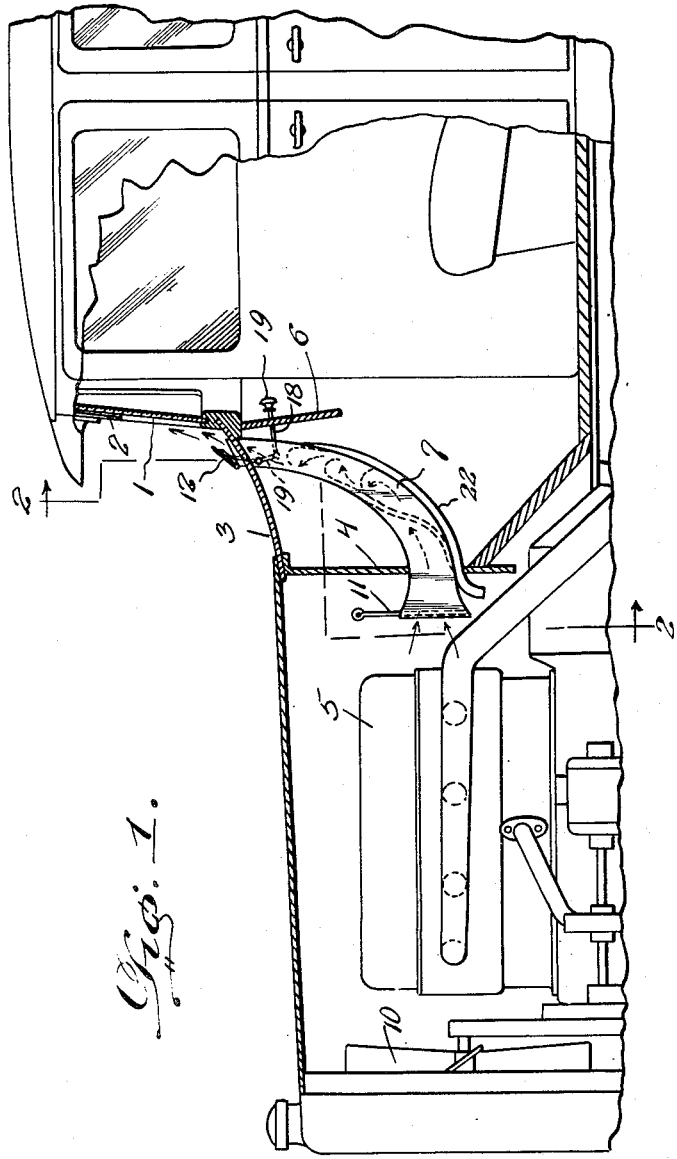
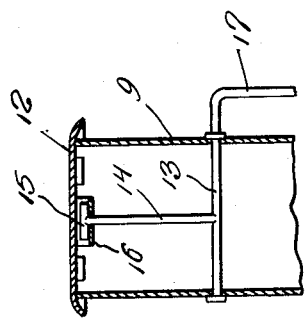
Clemens L. Paas,
INVENTOR.
BY J. Stanley Burch
ATTORNEY.

Jan. 6, 1931.  C. L. PAAS  1,787,836
MEANS FOR PREVENTING CONDENSATION ON WINDSHIELDS OR WINDOWS
Filed Feb. 18, 1930   2 Sheets-Sheet 2
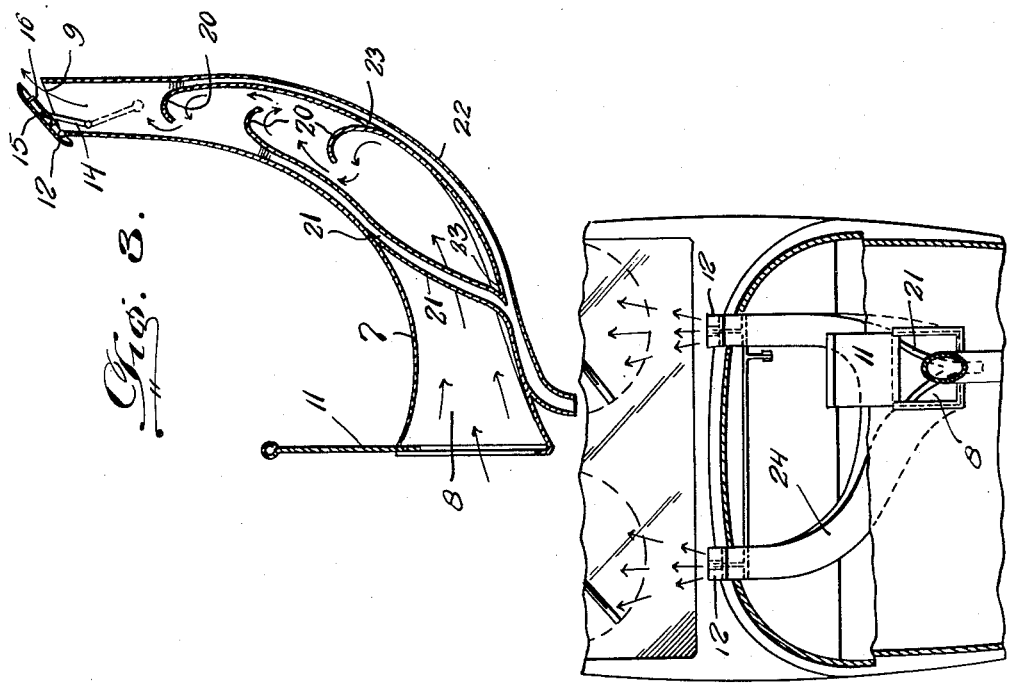
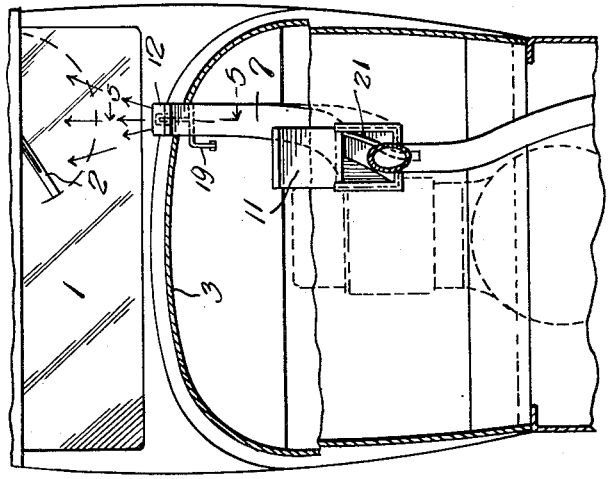
Clemens L. Paas,
INVENTOR.
BY J. Stanley Burch
ATTORNEY.

Patented Jan. 6, 1931

1,787,836

UNITED STATES PATENT OFFICE

CLEMENS L. PAAS, OF SPRING LAKE, MICHIGAN

MEANS FOR PREVENTING CONDENSATION ON WINDSHIELDS OR WINDOWS

Application filed February 18, 1930. Serial No. 429,370.

The present invention relates to improvements in condensation prevention means and has reference more particularly to an attachment on an automobile for preventing the accumulation of snow, ice, sleet or the like upon the winshield or windows, and whereby the operation of the usual windshield wiper will not be affected.

More particularly, the present invention aims to direct a blast of warm air against the outer face of the windshield or window and over the area within which the windshield wiper operates.

Still another object of the invention is to provide a device of the above-mentioned character that can be readily and easily installed on an automobile without necessitating any material alterations, means being associated with the device whereby the air will be heated by the motor and the heated air conducted through a conduit which terminates at its upper end in a discharge nozzle having an adjustable closure cap associated therewith to regulate the flow of the heated air that is discharged from the conduit.

Still another object is to provide a structure of the above-mentioned character wherein means is arranged within the conduit for preventing a discharge of any foreign matter with the heated air against the outer face of the windshield or window suitable outlets being associated with the heated air conduit for such foreign matter as well as for any water that may possibly enter the conduit.

Another object is to provide a device of the above-mentioned character that will at all times be positive and efficient in its operation, the same being further simple in construction, inexpensive, strong and durable.

Other objects and advantages of the present invention will become apparent from the following description when taken in connection with the accompanying drawings.

In the accompanying drawings wherein like reference characters indicate corresponding parts throughout the several views:

Figure 1 is a side elevation of my invention showing the same mounted on an automobile.

Figure 2 is a sectional view taken approximately on the line 2—2 of Figure 1, looking in the direction of the arrows.

Figure 3 is a longitudinal sectional view through the hot air conduit, the sliding closure for the inlet end of the conduit being shown in a raised position, and the closure lid for the outlet end of the conduit being shown partially opened.

Figure 4 is a view similar to Figure 2 showing a slight modification wherein a branch hot air conduit is provided for association with a vehicle equipped with tandem windshield wipers; and Figure 5 is a sectional view taken substantially on the line 5—5 of Figure 2 drawn on an enlarged scale.

In the drawings with reference more particularly to Figs. 1, 2, 3 and 5, the numeral 1 designates a windshield of an automobile, the customary windshield wiper that operates across the outer face of the windshield being shown at 2. The cowl of the automobile is indicated at 3 and the dash-board at 4. The motor is shown at 5 while the instrument board is denoted by the reference character 6.

My device comprises a curved vertically disposed heated air conduit 7 that increases gradually in size toward its lower end as is more clearly shown in the drawings, the conduit is preferably of rectangular configuration in cross section, although it is to be understood that I do not wish to limit myself to the particular shape of the conduit.

The lower end of the conduit 7 terminates in a flared hot air inlet 8 while the upper open end of the conduit constitutes what I term a hot air discharge nozzle 9. As is clearly shown in Figure 1, the lower end portion of the conduit 7 is disposed through the dash-board 4 so that the inlet end 8 will be disposed adjacent the motor 5 whereby the air surrounding the motor will be heated and will be caused to pass into the inlet mouth 8 by reason of the actuation of the fan 10.

The discharge nozzle 9 projects upwardly through the cowl 3 for disposition adjacent the windshield 1 and preferably adjacent that portion of the windshield through which the driver of the automobile sees. It will also be noted that the discharge nozzle 9 projects above the cowl so that water or the like cannot pass downwardly in the hot air conduit 7.

A sliding gate 11 is associated with the hot air inlet 8 and the gate may be lowered to close the inlet end of the hot air tube whenever desired. However when the device constituting my invention is in use, the gate is raised as shown in Figures 1, 2 and 3 and any appropriate means may be provided for holding the gate in its raised position.

A pivotally mounted closure cap or lid 12 is provided for the discharge nozzle 9 of the hot air conduit 7, said cap being preferably hinged at its forward edge portion and attention is now directed to Figure 5 of the drawings wherein there is disclosed the actuating means for the hinged lid or cap. Said actuating means includes a transverse shaft 13 that extends through the opposite sides of the upper end portion of the conduit 7 and carried by the shaft 13 for disposition upwardly in the discharge nozzle 9 is the arm 14 that is formed at its upper end with a cross piece 15 and this cross piece operates within a suitable bracket 16 carried by the under side of the intermediate portion of the lid or cap 12.

One end of the shaft 13 terminates in a downwardly extending lever 17 to which is connected the actuating rod 18, the latter extending through the instrument board 6 and having an operating knob 19 mounted on its free end.

By actuating the rod 18, the hinged cap or lid 12 may be adjusted for regulating the opening through which the hot air is discharged from the nozzle 9 and furthermore the lid or cap 12 will direct the heated air against the exposed face of the windshield. Also by disposing the hinged cap in the angular open position, the same will tend to create a suction at the discharge nozzle drawing the heated air upwardly through the conduit 7.

The invention further aims to provide a means within the hot air conduit 7 for preventing the discharge of any foreign matter with the heated air through the nozzle 9, and to this end, downwardly curved deflectors 20 are arranged on opposite sides of the interior of the conduit and also upon referring to Figure 3 it will be observed that these deflectors are arranged in staggered relation. Cooperating with the deflectors are the tubes 21 and 22, the tube 22 being disposed exteriorly along the bottom face of the conduit while the tube 21 is arranged within the interior of the conduit. Suitable outlet openings 23 are arranged in the bottom of the conduit for permitting the draining of the foreign matter into the outer tube 22 and the inner tube 21 communicates with the outer tube at a point adjacent the discharge end thereof.

In Figure 4 of the drawings, I have shown a slight modification of the invention wherein the same is adapted for association with a windshield equipped with tandem windshield wipers. In order to accommodate the invention with this arrangement of wipers, it is only necessary to provide a branch hot air conduit 24 for communication at its lower end with the conduit 7 and the discharge nozzle formed at the upper end of the branch conduit will extend upwardly through the cowl and will have the same mechanism arranged at the upper end thereof for regulating the discharge of heated air against the left side area of the windshield. It will only be necessary to extend the shaft 13 in order to effect the simultaneous actuation of the hinged lid on the upper end of the main and branch hot air conduits.

It will thus be seen from the foregoing description, that I have provided an attachment for automobiles that will at all times be positive and efficient in preventing the formation of snow, ice. sleet and the like on the exposed face of the windshield so that the operation of the windshield wiper will not be hindered and the simplicity of my device enables the same to be readily and easily attached without necessitating any material alterations.

While I have shown the preferred embodiment of the invention, it is to be understood that minor changes in the size, shape and arrangement of parts may be resorted to without departing from the spirit of the invention and the scope of the appended claims. For instance, hot air may be conveyed to a similar device associated with the rear window of the automobile, the air to be conveyed from within the engine hood to the device by means of a conduit extending rearwardly under the floor of the vehicle.

What I claim is:

1. A device of the class described comprising a vertically disposed hot air conduit for attachment on an automobile, the lower end of the conduit being directed forwardly and constructed to provide a hot air inlet, the upper end of the conduit being disposed adjacent the exposed face of a window or windshield and constituting a hot air discharge nozzle, and means arranged within the conduit for preventing the discharge of foreign matter through the hot air discharge nozzle.

2. A device of the class described comprising a vertically disposed hot air conduit for attachment on an automobile, the lower end of the conduit being directed forwardly and constructed to provide a hot air inlet, the upper end of the conduit being disposed adjacent the exposed face of a window or windshield and constituting a hot air discharge nozzle, and means arranged within the conduit for preventing the discharge of foreign matter through the hot air discharge nozzle, said means comprising downwardly curved deflectors arranged on the interior of the conduit.

3. A device of the class described comprising a vertically disposed hot air conduit for attachment on an automobile, the lower end of the conduit being directed forwardly and constructed to provide a hot air inlet, the upper end of the conduit being disposed adjacent the exposed face of a window or windshield and constituting a hot air discharge nozzle, and means arranged within the conduit for preventing the discharge of foreign matter through the hot air discharge nozzle, said means comprising downwardly curved deflectors arranged on the interior of the conduit, and outlet tubes for such foreign material.

4. A device of the class described comprising a vertically disposed hot air conduit for attachment on an automobile, the lower end of the conduit being directed forwardly and constructed to provide a hot air inlet, the upper end of the conduit being disposed adjacent the exposed face of a window or windshield and constituting a hot air discharge nozzle, and means arranged within the conduit for preventing the discharge of foreign matter through the hot air discharge nozzle, and a hinged cap arranged on the discharge nozzle for directing the hot air against the exposed face of the windshield or window.

5. A device of the class described comprising a vertically disposed hot air conduit for attachment on an automobile, the lower end of the conduit being directed forwardly and constructed to provide a hot air inlet, the upper end of the conduit being disposed adjacent the exposed face of a window or windshield and constituting a hot air discharge nozzle, and means arranged within the conduit for preventing the discharge of foreign matter through the hot air discharge nozzle, and a hinged cap arranged on the discharge nozzle for directing the hot air against the exposed face of the windshield or window, and means for adjusting the hinged cap from a remote point.

In testimony whereof I affix my signature.

CLEMENS L. PAAS.